(12) United States Patent
Barnes et al.

(10) Patent No.: US 8,094,669 B2
(45) Date of Patent: Jan. 10, 2012

(54) SYSTEM AND METHOD FOR STORE AND FORWARD ROUTING FOR DISTRIBUTED DESTINATIONS

(75) Inventors: Thomas E. Barnes, Whitehouse Station, NJ (US); William John Gallagher, Easton, PA (US)

(73) Assignee: Oracle International Corporation, Redwood Shores, CA (US)

( * ) Notice: Subject to any disclaimer, the term of this patent is extended or adjusted under 35 U.S.C. 154(b) by 12 days.

(21) Appl. No.: 12/109,078

(22) Filed: Apr. 24, 2008

(65) Prior Publication Data

US 2008/0267209 A1    Oct. 30, 2008

Related U.S. Application Data

(60) Provisional application No. 60/913,787, filed on Apr. 24, 2007.

(51) Int. Cl.
   *H04L 12/54* (2006.01)
(52) U.S. Cl. .................................................. 370/428
(58) Field of Classification Search .................. 370/351, 370/428, 389, 412, 419, 420, 421, 422, 425; 709/204, 206, 207, 223, 224, 225, 226
   See application file for complete search history.

(56) References Cited

U.S. PATENT DOCUMENTS

| | | | | |
|---|---|---|---|---|
| 6,529,932 | B1* | 3/2003 | Dadiomov et al. | 718/101 |
| 6,640,238 | B1* | 10/2003 | Bowman-Amuah | 709/201 |
| 6,985,440 | B1* | 1/2006 | Albert et al. | 370/230 |
| 7,162,512 | B1* | 1/2007 | Amit et al. | 709/206 |
| 7,184,421 | B1* | 2/2007 | Liu et al. | 370/338 |
| 2002/0059425 | A1* | 5/2002 | Belfiore et al. | 709/226 |
| 2002/0087704 | A1* | 7/2002 | Chesnais et al. | 709/228 |
| 2003/0009511 | A1* | 1/2003 | Giotta et al. | 709/201 |
| 2004/0023617 | A1* | 2/2004 | Mahany et al. | 455/41.1 |
| 2004/0030739 | A1* | 2/2004 | Yousefi'zadeh | 709/201 |
| 2004/0243733 | A1* | 12/2004 | Bichot et al. | 710/10 |
| 2005/0050221 | A1* | 3/2005 | Tasman et al. | 709/232 |

* cited by examiner

*Primary Examiner* — Kwang B Yao
*Assistant Examiner* — Obaidul Huq
(74) *Attorney, Agent, or Firm* — Fliesler Meyer LLP

(57) ABSTRACT

The present invention enables a store-and-forward service providing an efficient and reliable forwarding of messages stored in a message queue to a distributed destination. It provides customers with high availability and scalability for applications such as JMS queues and topics. It achieves load balancing and failover amongst all individual members of the distributed destination while ensuring that each message is delivered exactly once.

19 Claims, 2 Drawing Sheets

SYSTEM AND METHOD FOR STORE AND FORWARD ROUTING FOR DISTRIBUTED DESTINATIONS

CLAIM OF PRIORITY

This application claims priority from the following applications, which is hereby incorporated by reference in its entirety:

U.S. Provisional Application No. 60/913,787, entitled SYSTEM AND METHOD FOR STORE AND FORWARD ROUTING FOR DISTRIBUTED DESTINATIONS, by William John Gallagher and Thomas E. Barnes, filed on Apr. 24, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of message delivery to distributed destinations for messaging services.

BACKGROUND

A messaging service, for a non-limiting example, a Java® Messaging Service (JMS), is an application program interface (API) that supports the formal communication known as messaging between computers (servers) within a cluster in a network (a standalone server is considered as a cluster with one server). Here, messaging is the creation, storage, exchange, and management of messages between sources who send/publish the messages to a destination and consumers who receive, subscribe, and browse the messages from the destination. Here, a message can be but are not limited to, text, image, voice, telex, fax, e-mail, paging, and other suitable electronic data describing events, requests, and replies over a communication network.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable a store-and-forward (SAF) service providing an efficient and reliable forwarding of messages stored in a message queue to a distributed destination. It provides customers with high availability and scalability for applications such as JMS queues and topics. It achieves load balancing and failover amongst all individual members of the distributed destination while ensuring that each message is delivered exactly once. When a member destination is not available at the moment the messages are sent because of network problems or system failures, the messages will be persisted locally and then forwarded to the same destination once it becomes available or redirected toward other available members in the distributed destination.

A destination (endpoint) is a representation of software component, which can be either a queue or a topic on a remote server instance or cluster that the local server instance or cluster can send messages to. A distributed destination is a set of destinations that are accessible as a single, logical destination to a client and can have the following characteristics:

It is referenced by its own Java Naming and Directory Interface (JNDI) name, which is part of the Java platform, providing applications based on Java technology with a unified interface to multiple naming and directory services.

Members of the set are usually distributed across multiple servers within a cluster, with each destination member belonging to a separate server, which for a non-limiting example, can be a Java Messaging Service (JMS) server.

Figure 1:
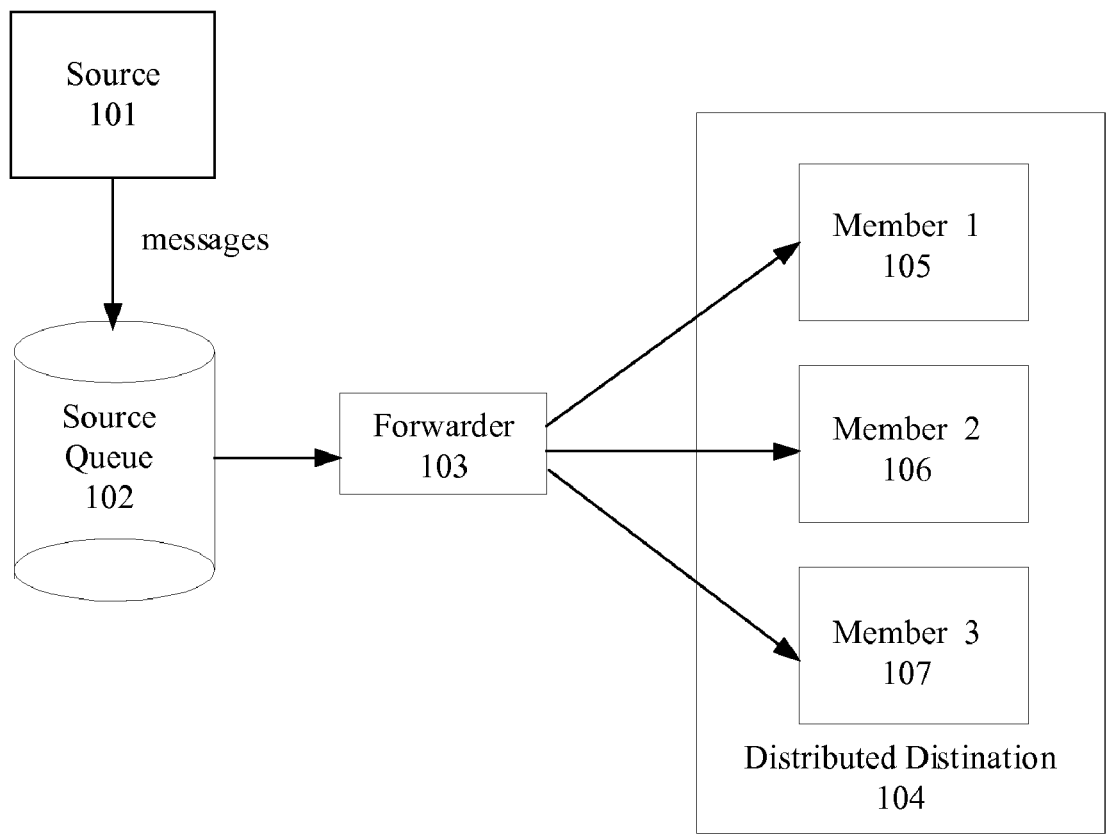
FIG. 1 is an illustration of an exemplary system for storing and forwarding messages to a distributed destination in one embodiment of the present invention.

FIG. 1 is an illustration of an exemplary system for storing and forwarding messages to a distributed destination in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a source 101 produces a stream of messages, which can be stored in a source queue 102. A forwarder 103 consumes messages from the source queue and attempts to forward the messages to a member destination 105 of the distributed destination 104, wherein this particular member destination is selected using a load-balancing approach. A typical load balancing approach can be, but is not limited to, round-robin load balancing where a message is sent to each member destination in turn, i.e., member_1 105, member_2 106, member_3 107, member_105).

In some embodiments, the source of a message is an application that sends the message, which can be but is not limited to, a producer, a front-end for a subsystem, a Web Service client for a Web services subsystem, or a sending agent. If the subsystem supports the concept of conversation or sequence of messages, the source may be the conversation itself.

In some embodiments, a member destination can be a JMS destination, a Web Services component, or a receiving agent. The distributed destination can be located on a cluster comprising one or more servers, each of which can be a JMS server or a Web server. The member destinations can be added or removed dynamically as the configuration of the cluster changes, i.e., servers are added or removed from the cluster.

Figure 2:
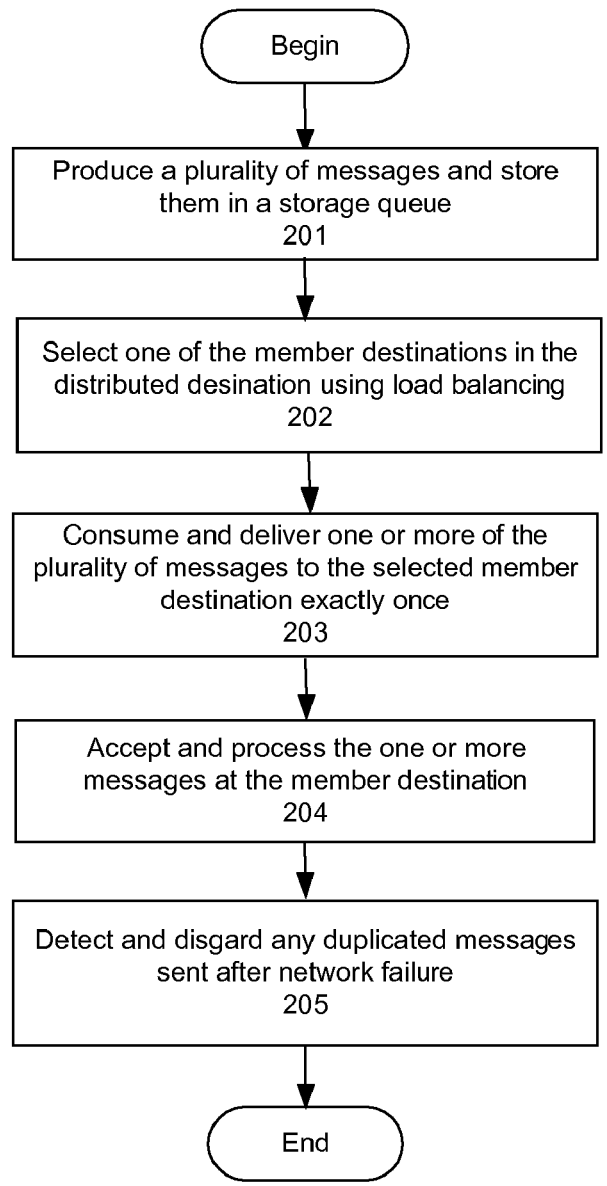
FIG. 2 is a flow chart illustrating an exemplary process for storing and forwarding messages to a distributed destination in accordance with one embodiment of the invention.

FIG. 2 is a flow chart illustrating an exemplary process for storing and forwarding messages to a distributed destination in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a source produces a plurality of messages and stores them in a storage queue at step 201. A forwarder then selects one of the member destinations in the distributed destination using load balancing at step 202, and consume and deliver one or more of the plurality of messages to the selected member destination exactly once at step 203. The member destination accepts and processes the one or more messages at step 204, and it can detect and discard any duplicated messages sent after network failure at step 205.

In the case of a network failure, it is not possible for the forwarder to determine if the member has received the message or not. The network could fail before the member received the message or after the message was delivered but before the network acknowledgement was delivered to the forwarder. The forwarder has no way to distinguish between the two types of failures. Because it cannot be determined whether the member received the message, the forwarder cannot simply attempt to redeliver the message to the member, since doing so may result in the member receiving a duplicate message. On the other hand, if the forwarder does not attempt to redeliver the message, the message may be lost.

In some embodiments, the problem of message delivery after network failure can be solved by using an XA transaction for each message that is sent by the forwarder. An XA transaction comes from the X/Open group specification on distributed, global transactions, which in the most general terms, is a "global transaction" that may span multiple resources. An XA transaction involves a coordinating transaction manager, with one or more databases (or other resources, like JMS) all involved in a single global transaction. In contrast, a non-XA transaction always involves just one resource and has no transaction coordinator, and a single resource is doing all its transaction work itself (this is sometimes called local transactions).

In some embodiments, the problem of message delivery after network failure can be solved by allowing the message recipient, the member destinations of the distributed destination, to detect and discard duplicates. In this scenario, the source queue assigns a unique sequence number to each message before it is persisted to the queue. The forwarder then forwards each message with its associated sequence number to the distributed destination. Each member keeps a "duplicate elimination record" which contains the sequence numbers of messages that it has previously received. When a message is received by the member destination, it compares its sequence number to the sequence number in its "duplicate elimination record". If the member determines that it has already received a given message, it simply discards the duplicate message. By performing duplicate elimination within each member, the forwarder can now recover from errors simply by resending messages. If a resent message was previously received by a member then the member will simply discard the duplicate message.

In some embodiments, it is important that the resend attempt is directed to the same physical member as the original send if a send attempt fails when forwarding to a distributed destination. This is necessary because only the original recipient contains the duplicate elimination history relevant to the particular message. For a non-limiting example, if Message One is sent to Member One and the sending fails, the sender cannot be sure whether the message was received by Member One. If the message was received by Member One before the error occurred, attempting to resend the message to Member Two would result in a duplicate message delivery since only Member One knows that the message was already delivered. In order to ensure that resent messages are always directed to the original message recipient it is necessary for the sender to record where each message is sent. Further, this information must be stored persistently on disk before the send is attempted in order to allow the sender to recovery from a crash.

In some embodiments, a naïve forwarding approach would simply write the message to disk before each network sends and deletes the record from disk upon a successful send to the intended recipient. As an optimization, the deletes could be performed lazily, allowing a single disk write for each message send. This approach would still result in an additional disk write per send in order to record the message routing information.

In some embodiments, an alternative approach takes advantage of the fact that the message is always persisted on the sending side before the forwarder attempts to send it to the recipient. This approach uses the sequence number that is persisted with the message in order to determine how to route the message as follows:

Let N=the sequence number of the message
Let M=the number of members in the destination cluster
Let R=N MODULO M The forwarder then routes the message to member 'R'.

One problem with this approach is that 'M', the number of members in the cluster may change, which would result in the routing information becoming inconsistent: A message with sequence number 'N' may not continue to route to member 'R' after 'M' changes. This breaks the invariant that the algorithm is attempting to preserve: that a message will always be routed to the same member.

In some embodiments, the forwarder uses a mapping table to determine which members correspond to which values of 'R' to preserve routing consistency. Each entry in the table maps a particular value of 'R' to a particular member as shown below:

| R value | Member |
|---------|----------|
| 0 | Member 1 |
| 1 | Member 2 |
| 2 | Member 3 |

This table is stored persistently on the disk and is changed only when the routing consistency can be preserved.

In some embodiments, when receives a message from the sending side queue, the forwarder examines its sequence number and performs a lookup in the table to determine which member the message should be forwarded to. If the send succeeds, the forwarder simply continues with the next message on the queue. No additional disk writes are required. If the send fails, however, the forwarder must change the routing table to remove the failed member. At the same time, the information about the failed message send must be persistently recorded so that the forwarder can later attempt to send the message to the same member.

As a non-limiting example, assume that the forwarder is using the table defined above and attempts to forward a message with a sequence number of '7'. The forwarder performs the modular calculation 7 MODULO 3=1. It then performs a table lookup of entry '1' to determine that the message should be forwarded to 'Member 2'. If the send fails, the table is rewritten to the disk as follows:

| R value | Member |
|---------|--------|
| 0 | Member 1 |
| 1 | Member 3 |

In-Doubt Messages

Message send failed message MESSAGE to Member 2

The entire table is written to the disk along with the in-doubt message list as a single atomic operation before the message is ACKed from the source queue. In the event that the disk write fails (typically as a result of the sending process crashing), the message table is left unaltered, and the message remains on the queue. Recovery of the algorithm always proceeds by dequeuing the next message in the queue in reconciling it with the routing table before sending it. If the disk write succeeds, the message is ACKed from the source queue. At some later time, the forwarder will then attempt to resend all of the messages in the in-doubt messages table.

Besides saving disk writes on the sending side, another advantage of this algorithm is that it allows the receiving cluster's membership to change dynamically. When the membership changes, the forwarder is notified through some external mechanism. The forwarder then rewrites a new routing table using the new membership information. The only precondition that is required to preserve routing consistency is that the forwarder is may not be in the middle of a send when the routing table is rewritten.

Another advantage of the algorithm is that it can be used to preserve message order, such that the ultimate message consumers that consume messages from the distributed destination can receive messages belonging to a well defined subset (sub-ordering) in the same order the sub-ordering existed in the original destination. A typical sub-ordering is the set of messages injected one at a time by a single entity (a JMS Sender for example). Orderings rather than sequence numbers can be used to determine R values and messages in a particular ordering aren't forwarded until all previous messages in the ordering have been forwarded. In another case, the use of XA alone doesn't preserve order in the event of failures.

One embodiment provides ordered and exactly-once forwarding of sequences of multiple sub-orderings from a local destination to a remote distributed remote destination. It also preserves this quality of service even in the event of typical failures (abrupt process, machine, or network crash) and a subsequent restart, and is efficient in that it can be implemented in a way that yields the same persistent I/O count as typical algorithms that don't preserve exactly-once or ordering. In addition, the embodiment requires no significant additional implementation on the remote destinations other than a duplicate elimination algorithm, and has no dependency on the XA transaction standard.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "destination" is used in the embodiments of the systems and methods described above, it will be evident that such concept can be interchangeably used with equivalent concepts such as, class, method, type, interface, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system for storing and forwarding messages to a distributed destination, comprising:
   one or more microprocessors;
   a source operable to produce a plurality of messages, wherein each message is adapted to be forwarded to the distributed destination, wherein the distributed destination includes a plurality of member destinations, and each said member destination is operable to accept and process one or more messages, and wherein each said message is assigned with a unique sequence number that associates each said message with a particular member destination, wherein the unique sequence number indicates how to route said message to a particular member destination;
   a source queue operable to store the plurality of messages; and
   a forwarder running on the one or more microprocessors that is operable to:
      consume one or more messages of the plurality of messages from the source queue;
      determine, for each said message, a particular member destination from the plurality of member destinations in the distributed destination based on an evaluation of the unique sequence number assigned to the message;
      deliver the one or more messages of the plurality of messages to the distributed destination exactly once;
      provide ordered forwarding of sequences of multiple sub-orderings from a local destination to a remote distributed remote destination;

preserve quality of service even in an event of a subsequent restart after a system failure;
use an algorithm that yields the same persistent I/O count as algorithms that don't preserve exactly-once or ordering;
require no significant additional implementation on the remote destinations other than a duplicate elimination algorithm; and
have no dependency on a XA transaction standard.

2. The system according to claim 1, wherein:
each said message is one of a text, an image, a voice, a telex, a fax, an e-mail, a paging, and an electronic data describing events, requests, and replies over a communication network.

3. The system according to claim 1, wherein:
the source is one of a producer, a front-end for a subsystem, a Web Service client for a Web services subsystem, and a sending agent.

4. The system according to claim 1, wherein:
each of the plurality of member destinations can be one of a queue, a topic, a remote server instance, a cluster, a JMS destination, a Web Services component, and a receiving agent.

5. The system according to claim 1, wherein:
the distributed destination locates on a cluster of one or more servers.

6. The system according to claim 1, wherein:
the forwarder uses a load balancing strategy that is round-robin load balancing.

7. The system according to claim 1, wherein:
the source queue is further operable to persist the one or more of the plurality of messages to disk before delivering.

8. The system according to claim 1, wherein:
the forwarder is further operable to:
examine the sequence number of one of the plurality of messages; and
perform a lookup in a mapping table to determine which member destination the message should be forwarded to.

9. The system according to claim 1, wherein:
the forwarder is further operable to:
deliver the one or more messages of the plurality of messages exactly once after network failure via at least one of:
a XA transaction;
resending the one or more messages of the plurality of messages to the particular member destination, which is operable to detect and discard duplicated messages resent; and
resending the one or more messages of the plurality of messages to a same physical member destination in the distributed destination.

10. The system according to claim 1, wherein:
when the distributed destination includes a fixed number of member destinations, the particular member destination for delivering the one or more messages is determined based on an evaluated value that equals to the unique sequence number assigned to the message modulo the fixed number of member destinations in the distributed destination.

11. The system according to claim 10, wherein:
the forwarder uses a table to determine a particular member destination in the distributed destination to receive the message based on the evaluated value, wherein the table includes an in-doubt message lists.

12. The system according to claim 1, wherein:
the forwarder is further operable to preserve a message order for a plurality of messages belonging to a well defined subset, wherein the forwarder waits until all previous message in the subset have been forwarded before the forwarder forwards a subsequent message.

13. The system according to claim 1, wherein:
the forwarder uses a message order number for a plurality of messages belonging to a subset to determine how to route a message in the plurality of messages, wherein the message is forwarded to a distributed destination that is associated with an evaluated value that equals to the message order number assigned to the message modulo a fixed number of member destinations in the distributed destination.

14. A method for storing and forwarding messages to a distributed destination, comprising:
producing, via a source, a plurality of messages, wherein each message is adapted to be forwarded to the distributed destination, wherein the distributed destination includes a plurality of member destinations, and each said member destination is operable to accept and process one or more said messages;
allowing each said message to be assigned with a unique sequence number that associated each said message with a particular member destination, wherein the unique sequence number indicates how to route said message to a particular member destination;
storing, via a source queue, the plurality of messages;
consuming one or more messages of the plurality of messages from the source queue;
determining, for each said message, a particular member destination from the plurality of member destinations in the distributed destination based on an evaluation of the unique sequence number assigned to the message;
delivering the one or more messages of the plurality of messages to the distributed destination exactly once;
providing ordered forwarding of sequences of multiple sub-orderings from a local destination to a remote distributed remote destination;
preserving quality of service even in an event of a subsequent restart after a system failure;
using an algorithm that yields the same persistent I/O count as algorithms that don't preserve exactly-once or ordering;
requiring no significant additional implementation on the remote destinations other than a duplicate elimination algorithm; and
having no dependency on a XA transaction standard.

15. The method according to claim 14, further comprising:
persisting the one or more of the plurality of messages to disk before delivering.

16. The method according to claim 14, further comprising:
examining the sequence number of one of the plurality of messages; and
performing a lookup in a mapping table to determine which member destination the message should be forwarded to.

17. The method according to claim 14, further comprising:
resending the one or more messages of the plurality of messages to the member destination after network failure; and
detecting and discarding duplicated messages.

18. The method according to claim 17, further comprising:
resending the one or more of the plurality of messages are to the same physical member destination in the distributed destination.

19. A non-transitory machine readable medium having instructions stored thereon that when executed cause a system to:
- produce, via a source, a plurality of messages, wherein each message is adapted to be forwarded to a distributed destination, wherein the distributed destination includes a plurality of member destinations, and each said member destination is operable to accept and process one or more said messages;
- allow each said message to be assigned with a unique sequence number that associates each said message with a particular member destination, wherein the unique sequence number indicates how to route said message a particular member destination;
- store, via a source queue, the plurality of messages;
- consume one or more of the plurality of messages from the source queue;
- determine, for each said message, a particular member destination from the plurality of member destinations in the distributed destination based on an evaluation of the unique sequence number assigned to the message;
- deliver the one or more messages of the plurality of messages to the distributed destination exactly once;
- provide ordered forwarding of sequences of multiple sub-orderings from a local destination to a remote distributed remote destination;
- preserve quality of service even in an event of a subsequent restart after a system failure;
- use an algorithm that yields the same persistent I/O count as algorithms that don't preserve exactly-once or ordering;
- require no significant additional implementation on the remote destinations other than a duplicate elimination algorithm; and
- have no dependency on a XA transaction standard.

* * * * *

UNITED STATES PATENT AND TRADEMARK OFFICE
CERTIFICATE OF CORRECTION

Page 1 of 1

PATENT NO.           : 8,094,669 B2
APPLICATION NO.      : 12/109078
DATED                : January 10, 2012
INVENTOR(S)          : Barnes et al.

It is certified that error appears in the above-identified patent and that said Letters Patent is hereby corrected as shown below:

On sheet 1 of 2, in figure 1, Box. No. 104, line 1, delete "Distination" and insert -- Destination --, therefor.

On sheet 2 of 2, in figure 2, Box. No. 202, line 2, delete "desination" and insert -- destination --, therefor.

On sheet 2 of 2, in figure 2, Box. No. 205, line 1, delete "disgard" and insert -- discard --, therefor.

In column 2, line 48, delete "member_105)." and insert -- member_1 105. --, therefor.

In column 8, line 25, in Claim 14, delete "associated" and insert -- associates --, therefor.

In column 8, line 66, in Claim 18, delete "to the" and insert -- to a --, therefor.

In column 9, line 16, in Claim 19, after "more" insert -- messages --.

Signed and Sealed this
Tenth Day of April, 2012

David J. Kappos
*Director of the United States Patent and Trademark Office*